(12) United States Patent
Javaruski et al.

(10) Patent No.: US 7,150,795 B2
(45) Date of Patent: Dec. 19, 2006

(54) TRANSPARENT WINDSHIELD WIPER ASSEMBLY AND METHOD OF CLEANING A WINDSHIELD

(76) Inventors: Russell J. Javaruski, 978 B Aberdeen Ct., Lakewood, NJ (US) 08701; Robert Gortner, 256 Stone Rd., West Creek, NJ (US) 08092

(*) Notice: Subject to any disclaimer, the term of this patent is extended or adjusted under 35 U.S.C. 154(b) by 0 days.

(21) Appl. No.: 11/130,879

(22) Filed: May 17, 2005

(65) Prior Publication Data

US 2005/0211272 A1 Sep. 29, 2005

Related U.S. Application Data

(63) Continuation-in-part of application No. 10/616,245, filed on Jul. 9, 2003, now abandoned.

(51) Int. Cl.
*B60S 1/32* (2006.01)

(52) U.S. Cl. ............... 134/6; 15/250.001; 15/250.351; 15/250.361; 15/250.48

(58) Field of Classification Search ........... 15/250.001, 15/250.351, 250.48, 250.361, 250.43, 250.44; 134/6

See application file for complete search history.

(56) References Cited

U.S. PATENT DOCUMENTS

| 3,371,368 A | * | 3/1968 | Walker | 15/250.04 |
| 3,428,992 A | * | 2/1969 | Di Giorgio | 15/250.04 |
| 3,631,561 A | * | 1/1972 | Aszkenas | 15/250.41 |

FOREIGN PATENT DOCUMENTS

| FR | 2482540 | * | 11/1981 |
| JP | 52-5123 | * | 1/1977 |
| JP | 58-206451 | * | 12/1983 |

OTHER PUBLICATIONS

Translation of French patent 2482540 dated May 10, 2004, by Actoin Translation Bureau.*

* cited by examiner

*Primary Examiner*—Gary K. Graham
(74) *Attorney, Agent, or Firm*—Arthur M. Peslak

(57) ABSTRACT

A transparent windshield wiper assembly is disclosed. The construction details of the assembly are similar to the construction of conventional available wipers but the assembly is fabricated from transparent plastic materials. The wiper blade and wiper arm are also provided with a photochromic dye to reduce glare on sunny days.

5 Claims, 1 Drawing Sheet

TRANSPARENT WINDSHIELD WIPER ASSEMBLY AND METHOD OF CLEANING A WINDSHIELD

RELATED APPLICATIONS

This application is a continuation-in-part of co-pending application Ser. No. 10/616,245 dated Jul. 9, 2003 now abandoned.

BACKGROUND OF THE INVENTION

The present invention is directed to the field of windshield wipers. There are several problems with existing windshield wipers. The first relates to visibility. Since the blades and arms of windshield wipers are generally black or another dark color, the existing windshield wipers generally act to obstruct the driver's vision to some extent. In addition, during long periods of driving with the windshield wipers operating, the constant motion of the windshield wipers can have a hypnotic effect on the driver causing the driver to become drowsy. Both of these problems create potential safety issues. The object of the present invention is to provide a windshield wiper that solves these safety problems.

SUMMARY OF THE INVENTION

The present invention is directed to a windshield wiper blade and arm that solves the aforementioned safety defects in available windshield wipers. The present invention is directed to a windshield wiper blade and arm assembly fabricated from transparent plastic type material. By fabricating the assembly from such material, the obstruction of the driver's vision during operation is reduced significantly. In addition, the hypnotic effect of the windshield wiper is also reduced. The present invention further comprises a photochromic dye so that any glare from the clear plastic material of the windshield wiper during a sunny day is reduced.

DETAILED DESCRIPTION OF THE INVENTION

Figure 1:
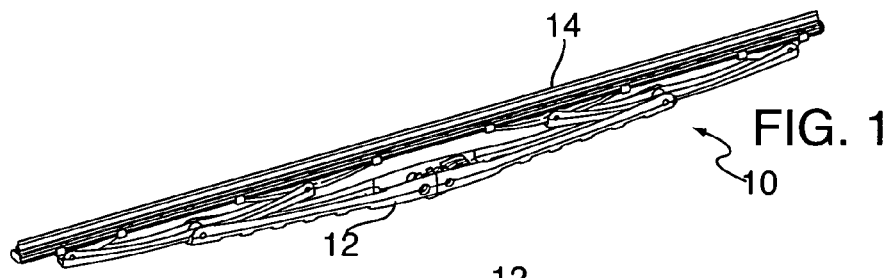
FIG. 1 is a plan view of the present invention.
Figure 2:
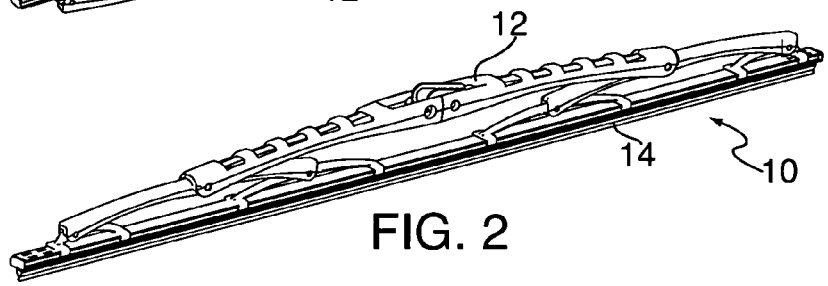
FIG. 2 is an alternative plan view of the present invention.
Figure 3:
FIG. 3 is a top view of the present invention.
Figure 4:
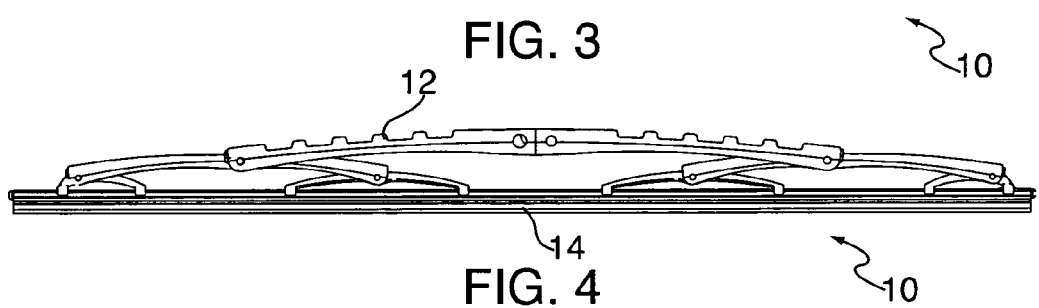
FIG. 4 is a side view of the present invention.
Figure 5:
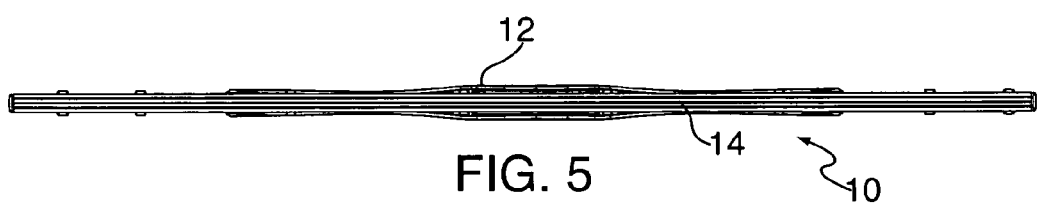
FIG. 5 is a bottom view of the present invention.
Figure 6:
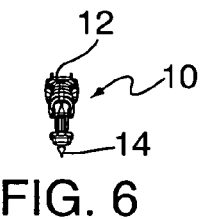
FIG. 6 is a side view of the present invention.

The present invention will now be described in the context of the presently preferred embodiment of the invention as shown in the drawing. Those of ordinary skill in the art will recognize that the present invention is not limited to the embodiment described herein.

FIG. 1 illustrates the windshield wiper and blade assembly of the present invention. As can be seen from FIG. 1, the size, shape, and configuration of the windshield wiper of the present invention is presently contemplated to be identical to presently available windshield wiper assemblies. The difference between the present invention and prior windshield wiper assemblies is that the present invention is fabricated from transparent plastic material. The wiper arm is presently contemplated to be fabricated from a rigid plastic material such as Polycarbonate. The wiper blade is presently contemplated to be fabricated from a flexible rubber like plastic material such as Silicone Base.

In use, the present invention will greatly reduce, if not eliminate, the vision obstruction that occurs with a conventional black windshield wiper assembly. The transparency of the present invention will also greatly reduce the hypnotic effect from prolonged windshield wiper use since during use, the assembly will be virtually invisible.

One potential issue with a transparent, plastic windshield wiper blade and assembly is related to glare on a sunny day. Such reflections can distract the driver of the vehicle as well as cause vision problems. In order to ameliorate this issue, the present invention contemplates the use of a photochromic dye in the plastic material of the windshield wiper blade and arm. One such photochromic dye is PhotoSol® sold by PPG Optical Products. However, those of ordinary skill in the art will realize that other equivalent photochromic dyes may also be used without deviation from the spirit or scope of the present invention. Photochromic dyes are clear when not exposed to harsh sunlight. However, when such materials are exposed to sunlight, the materials turn dark black. Thus, by utilizing a photochromic dye distributed throughout the wiper arm and blade, the issue with glare on sunny days is resolved. However, the basic thrust of the invention is still maintained since on cloudy, rainy days, the wiper blade and arm will remain transparent. It is currently contemplated that the use of 1 to 20 grams of photochromic dye per kilogram of clear plastic will provide the desired effect.

Those of ordinary skill in the art will recognize that the embodiment just described merely illustrates the principals of the present invention. Many modifications may be made thereto without departing from the spirit and scope of the present invention as set forth in the following claims.

What is claimed is:

1. An improved windshield wiper assembly comprising a wiper arm fabricated from a rigid transparent material and a wiper blade attached to the wiper arm fabricated from a flexible transparent material wherein the wiper blade and wiper arm each further comprise a photochromic dye dispersed therein which is adapted so that the wiper blade and wiper arm will turn black when exposed to the sun.

2. The windshield wiper assembly of claim 1 wherein the wiper arm is fabricated from Polycarbonate and the wiper blade is fabricated from Silicone Base.

3. The windshield wiper assembly of claim 1 wherein the photochromic dye is added to the wiper blade in the range of 1 to 20 grams per kilogram of flexible, transparent material.

4. The windshield wiper assembly of claim 2 wherein the photochromic dye is added to the wiper arm in the range of 1 to 20 grams per kilogram of Polycarbonate.

5. A method for cleaning water or debris from an automobile windshield while not interfering with the driver's vision comprising the following steps:
   a) Fabricating a windshield wiper arm from a transparent material where the windshield wiper arm comprises a photochromic dye such that the windshield wiper arm turns black when exposed to sunlight;
   b) Fabricating a windshield wiper blade from a transparent material where the windshield wiper blade comprises a photochromic dye such that the windshield wiper blade turns black when exposed to sunlight.;
   c) Attaching the wiper blade to the wiper arm to form a combination.
   d) Providing the combination to the public via retail trade channels;
   e) Replacing an automobile's conventional windshield wiper assembly with the combination; and
   f) Using the combination to remove water or debris from the automobile windshield.

* * * * *